(12) United States Patent  (10) Patent No.: US 9,148,313 B2
Poulton  (45) Date of Patent: Sep. 29, 2015

(54) EQUALIZING TRANSMITTER AND METHOD OF OPERATION

(75) Inventor: John Wood Poulton, Chapel Hill, NC (US)

(73) Assignee: Rambus, Inc., Los Altos, CA (US)

(*) Notice: Subject to any disclaimer, the term of this patent is extended or adjusted under 35 U.S.C. 154(b) by 1131 days.

(21) Appl. No.: 12/522,308

(22) PCT Filed: Jan. 7, 2008

(86) PCT No.: PCT/US2008/000195
§ 371 (c)(1),
(2), (4) Date: Jul. 7, 2009

(87) PCT Pub. No.: WO2008/085943
PCT Pub. Date: Jul. 17, 2008

(65) Prior Publication Data
US 2010/0027712 A1  Feb. 4, 2010

Related U.S. Application Data

(60) Provisional application No. 60/879,443, filed on Jan. 9, 2007.

(51) Int. Cl.
*H04L 27/28* (2006.01)
*H04L 25/02* (2006.01)
*H04L 25/03* (2006.01)

(52) U.S. Cl.
CPC ......... *H04L 25/0288* (2013.01); *H04L 25/0272* (2013.01); *H04L 25/0282* (2013.01); *H04L 25/03343* (2013.01); *H04L 2025/03808* (2013.01)

(58) Field of Classification Search
CPC ............ H04L 25/0288; H04L 25/0272; H04L 25/0282; H04L 25/03808
USPC ......... 375/219, 229, 232, 233, 258, 295, 296, 375/326, 340
See application file for complete search history.

(56) References Cited

U.S. PATENT DOCUMENTS 5,708,389 A * 1/1998 Gabara ........................ 327/552
5,774,505 A * 6/1998 Baugh ........................ 375/348
(Continued)

FOREIGN PATENT DOCUMENTS

EP  1557960  7/2005
EP  1622036  2/2006
(Continued)

OTHER PUBLICATIONS

JP Office Action dated Mar. 8, 2012 re JP Application No. 2009-544946. 8 pages.
(Continued)

*Primary Examiner* — Syed Haider
(74) *Attorney, Agent, or Firm* — Hamilton, Brook, Smith & Reynolds, P.C.

(57) ABSTRACT

A transmitter for providing channel equalization that includes a first driver and second driver having a high pass filter. The first driver generates a first output signal representing a digital input signal. The second driver generates a second output signal representing a high pass filtered version of the digital input signal. The first and second output signals are summed to provide a third output signal that is channel equalized for transmission over a channel.

24 Claims, 12 Drawing Sheets

(56) References Cited

U.S. PATENT DOCUMENTS

| | | | |
|---|---|---|---|
| 5,939,927 A * | 8/1999 | Myers | 327/390 |
| 2005/0164661 A1 * | 7/2005 | Moon | 455/127.1 |
| 2006/0034358 A1 * | 2/2006 | Okamura | 375/219 |
| 2006/0088089 A1 * | 4/2006 | Gondi et al. | 375/232 |
| 2007/0098124 A1 * | 5/2007 | Kurata et al. | 375/353 |
| 2008/0056344 A1 * | 3/2008 | Hidaka | 375/232 |

FOREIGN PATENT DOCUMENTS

| | | | |
|---|---|---|---|
| JP | 59-058943 | 4/1984 | H04L 25/02 |
| JP | 62-245733 | 10/1987 | H04B 3/00 |
| JP | 02-111126 | 4/1990 | H04B 3/04 |
| JP | 2005-229595 | 8/2005 | H03K 5/125 |

OTHER PUBLICATIONS

Maxim High-Frequency/Fiber Communications Group: "Equalize 10Gbase-CX4 and Copper InfiniBand Links with the MAX3983" Maxim Design Note: HFDN-27.O, (Sep. 12, 2003), pp. 1-7.

Dally W J. et al: "Transmitter Equalization for 4-GBPS Signaling" IEEE Micro, IEEE Service Center, Los Alamitos, CA, US, vol. 17, No. 1, (Jan. 1, 1997), pp. 48-56.

International Search Report, PCT/US2008/000195, dated Nov. 10, 2008.

* cited by examiner

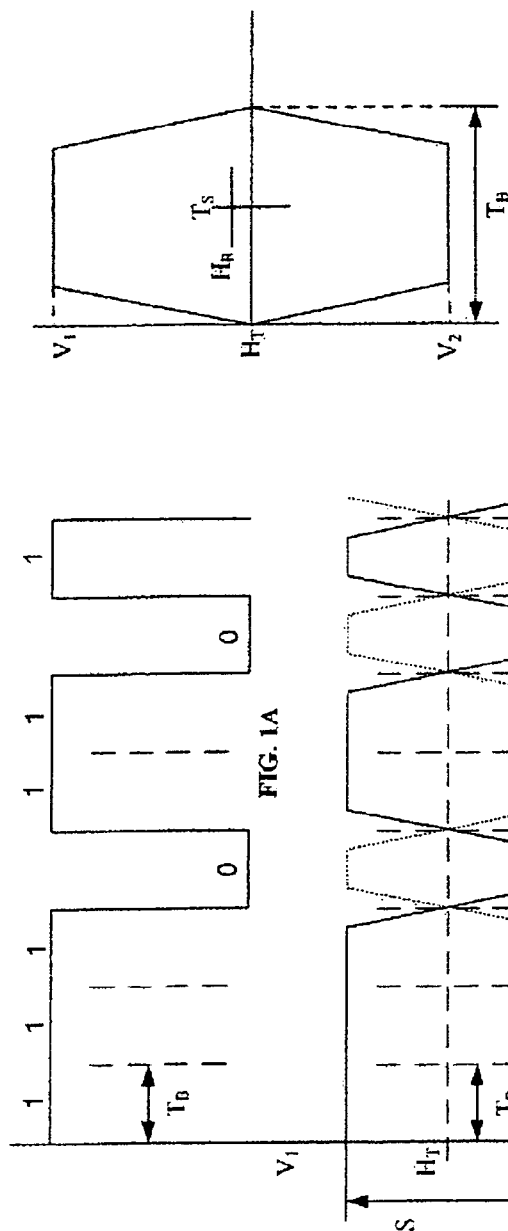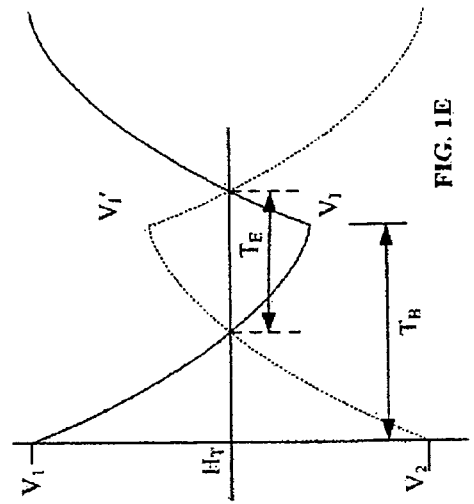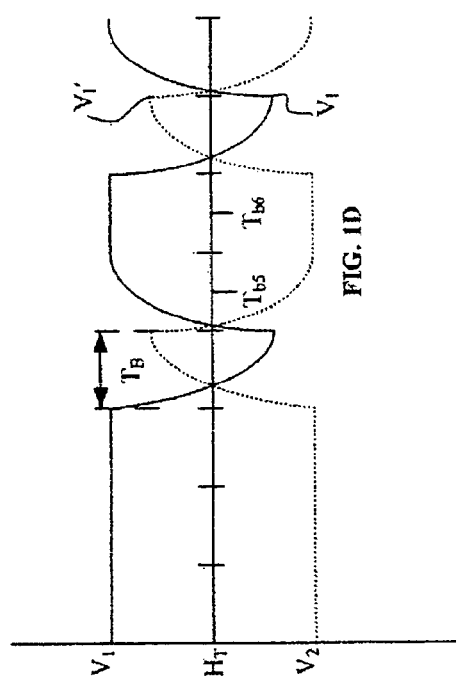

EQUALIZING TRANSMITTER AND METHOD OF OPERATION

CROSS REFERENCE

The present application is a national stage application under 35 U.S.C. §371 of International Application No. PCT/US2008/000195 filed Jan. 7, 2008, which claims priority from U.S. provisional patent application 60/879,443 filed Jan. 9, 2007, the disclosures of which are hereby incorporated herein by reference.

BACKGROUND OF THE INVENTION

In a conventional digital transmission system, a transmitter sends digital signals by setting a signal parameter of an output signal such as the current or voltage of the output signal to one of a plurality of discrete values during each of a succession of intervals referred to herein as data intervals. The value of the parameter during each data interval denotes a digital value being transmitted during that data interval. For example, in a binary system, the transmitter may set the signal parameter to a first value when a digital 1 is being sent and to a second, different value when a digital 0 is being sent. The output signal from the transmitter passes to the receiver over a channel or signal path. The signal typically experiences distortion as it propagates through the signal path from the transmitter to the receiver. One type of distortion arises from temporal spreading of the signal, which results in the signal parameter during a given data interval, as received by the receiver, being affected by the signal parameter during other data intervals. This effect is referred to as inter-symbol interference (ISI). As further discussed below, ISI makes it more difficult, or impossible, for the receiver to determine the value of the signal parameter during each individual data interval. The distortion which causes ISI may arise from frequency dependent attenuation in the signal path. Typically, signal components at higher frequencies are attenuated to a greater degree than signal components at lower frequencies. It is desirable for a transmission system to compensate for this frequency dependent attenuation.

BRIEF DESCRIPTION OF THE DRAWINGS

FIGS. 1A-1E illustrate the effects of frequency dependent attenuation.

DETAILED DESCRIPTION

Figure 2:
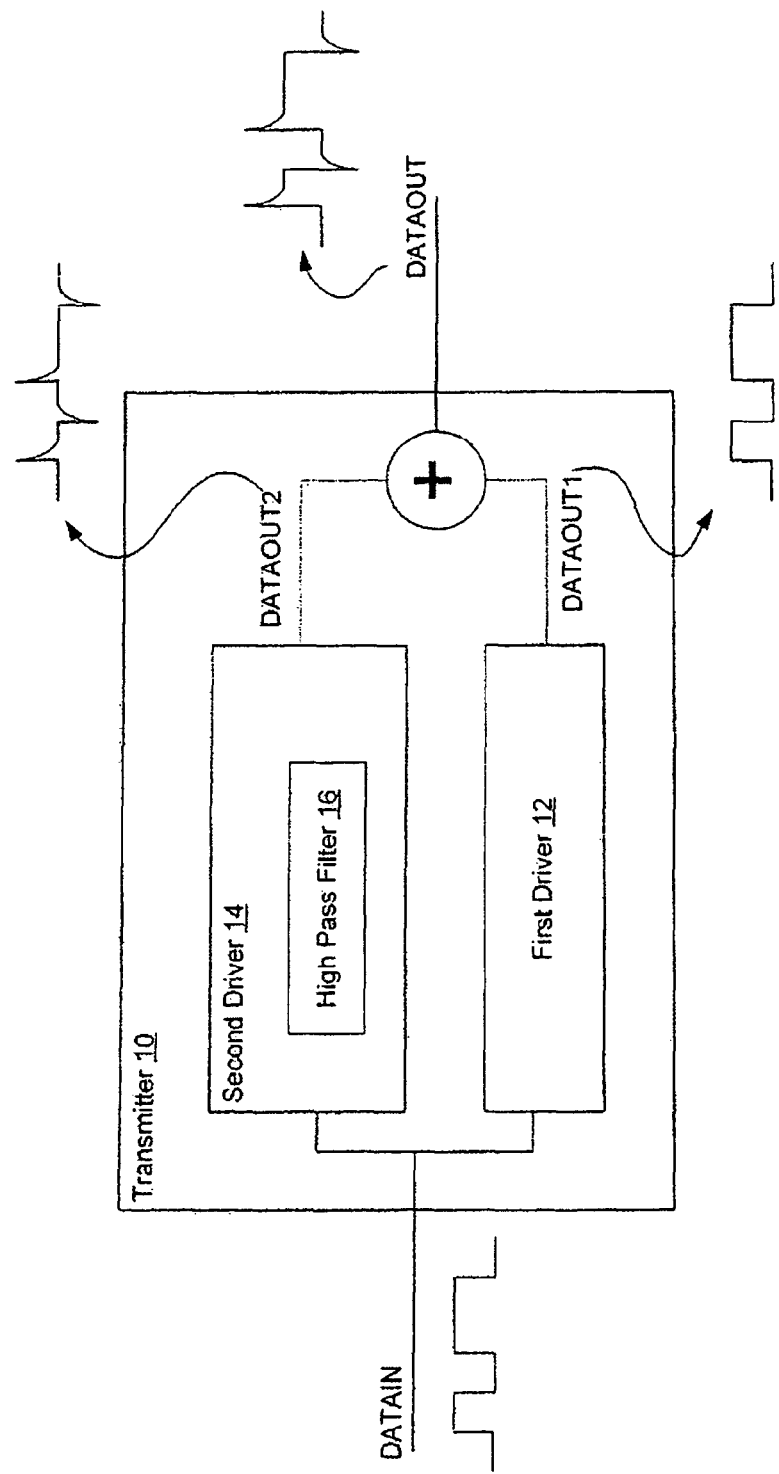
FIG. 2 is a block diagram of a transmitter equalizer in accordance with an embodiment of the present application.

Certain effects of frequency dependent attenuation are diagrammatically illustrated by FIGS. 1A-1E. FIG. 1A depicts a series of digital values 11101101 in a binary system. FIG. 1B depicts in solid lines a signal sent by a typical transmitter representing the series of digital values shown in FIG. 1A. For the first three data intervals $T_B$ (also referred to as "bit intervals") the signal parameter as, for example, current or voltage, remains at steady state at a first discrete value $V_1$ representing the digital value 1. At the beginning of the fourth interval, the signal parameter changes abruptly, over a transition time $T_t$ much less than a bit interval $T_B$, to the second discrete value $V_2$ representing the digital value 0. At the beginning of the next bit interval, the signal parameter returns abruptly to the first value $V_1$ representing digital 1, and so on. Stated another way, at each transition between bit intervals having different data values, the signal parameter approximates a perfect square wave having a "swing" or difference between values $S=(V_1-V_2)$, the wave being centered on a transmitter threshold value $H_T$ midway between the first and second discrete values $V_1$ and $V_2$. Although the signal may or may not be periodic depending on the content of the data being transmitted, the signal can be regarded as having a data rate of $1/T_B$ and a bit toggle frequency $f=1/(2T_B)$. An output signal representing the opposite series of data values (00010010) is shown in broken lines in FIG. 1B; this is the same as the signal shown in solid lines, but inverted.

FIG. 1C depicts the operation of a receiver, which is receiving the signal of FIG. 1B with no distortion or noise. The receiver determines whether the value of the signal parameter is above or below a receiver threshold $H_R$ at a sampling time $T_s$. If the value of the signal parameter is above $H_R$, the receiver determines that a digital value 1 was received; if the signal parameter is below $H_R$, the receiver determines that a digital 0 was received. Ideally, Ts is exactly centered in the bit interval $T_B$ and $H_R$ is exactly equal to $H_T$. However, as indicated in FIG. 1C, these conditions may not be fulfilled exactly. Because the signal parameter rises and falls abruptly and always reaches the full discrete value $V_1$ or $V_2$ during each data interval, the receiver will still detect the correct digital values even if $H_R$ is offset somewhat from $H_T$ and $T_s$ is offset from the exact center of the data interval. The shaded area in FIG. 1C depicts the margins for errors in centering $T_s$ and in aligning $H_R$ with $H_T$. Because the shaded area can have a shape resembling an eye, such a diagram is commonly referred to as a "data eye".

FIG. 1D depicts the signals of FIG. 1B after transmission through a signal channel which attenuates high frequency components of the signal, at frequencies above the bit toggle frequency f of the signal, without substantially attenuating components below the bit toggle frequency f. Here again, the solid-line graph depicts the signal representing the series of digital values 11101101 and the broken-line graph depicts the signal representing the opposite series of digital values. Referring to the solid-line graph, because the high-frequency components of the signal are attenuated, the signal parameter decreases gradually from $V_1$ towards $V_2$ after commencement of the fourth bit interval. The signal parameter never reaches $V_2$ during the bit interval, but instead only reaches an intermediate value $V_I$ at the end of this bit interval. Note that the signal parameter barely crosses the transmitter threshold $H_T$. During the next bit interval $T_{b5}$, the signal parameter increases back from the intermediate $V_I$ value toward $V_1$. Because the low-frequency components of the signal below the bit toggle frequency f are not appreciably attenuated by the signal path, the signal parameter may reach its full value $V_1$ during $T_{b5}$ or $T_{b6}$. Thus, the signal starts again from the full value $V_1$ during the following bit interval $T_{b7}$. Here again, the broken-line graph shows the opposite pattern, with the signal parameter increasing gradually from $V_2$ to an intermediate value $V_{I'}$ during the bit interval $T_{b4}$ where the signal represents a digital 1 after a series of digital 0's.

As shown in the eye diagram of FIG. 1E, the height of the data eye for the receiver is $(V_{I'}-V_I)$ rather than the full swing S or $V_1$-$V_2$. Stated another way, a high-frequency attenuation factor of A reduces the height of the eye opening from S to S(2A−1) with the eye opening or shaded area completely disappearing at A<0.5. The height of the eye opening is the amount of effective signal swing available to tolerate offset of the receiver threshold $H_R$ from the transmitter threshold $H_T$ and other sources of noise such as crosstalk, reflections of previous bits, and coupled supply noise, any or all of which may cause the signal parameter as received to vary from the values shown in the graphs. Moreover, the width or temporal extent of the eye is also reduced to a time $T_E$ which is less than the full bit interval $T_B$. This effect causes greater sensitivity to misalignment between the sampling time $T_S$ and the center of the data eye, and hence causes greater sensitivity to skew and jitter in the signal or sampling clock. Moreover, the effects of signal distortion on the waveform may introduce noise into the timing loop used by the receiver to control the sampling time $T_S$.

FIG. 2 shows one embodiment of an equalizing transmitter 10. The transmitter 10 can be used, by way of example, as part of an integrated circuit device coupled to a channel or signal path where the output of the transmitter 10 is sent over the channel or signal path 50 to a receiver (not shown). The transmitter 10 provides channel equalization by modifying a square-wave-like signal to form a transmitted signal so that a concatenation of the transmitted signal and the frequency response of the channel provide a substantially square-wave-like signal at the receiver.

In the depicted embodiment, the transmitter 10 includes a first driver 12 and a second driver 14 and receives a digital input signal DATAIN. The first driver 12 outputs a first output data signal DATAOUT1 representing the digital input signal DATAIN. The second driver 14 includes a high pass filter 16 and generates a second output signal DATAOUT2 representing a high pass filtered version of the input signal DATAIN. The output signals DATAOUT1, DATAOUT2 are combined to produce a resultant channel equalized signal DATAOUT for transmission over the channel 50.

Figure 3:
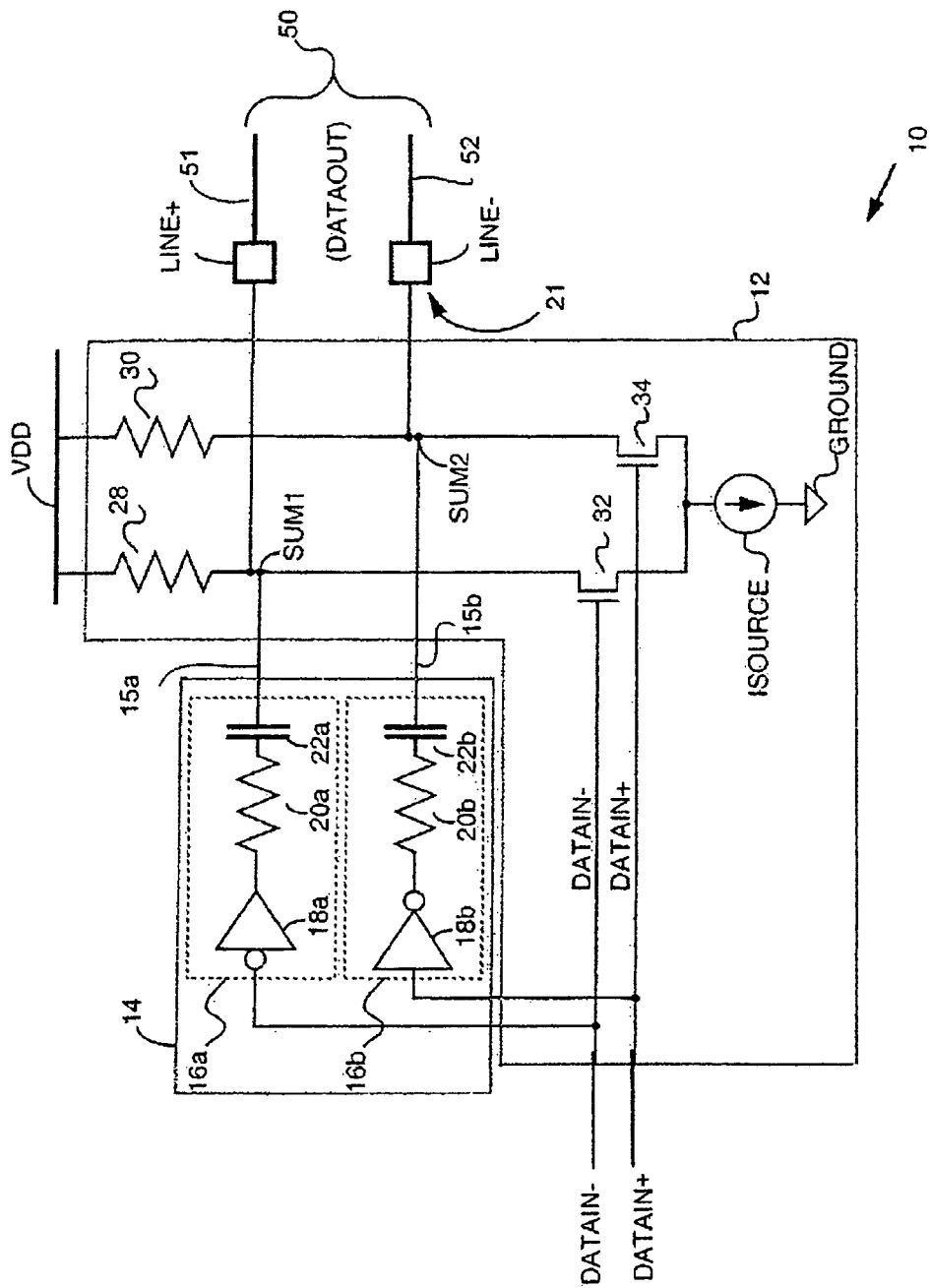
FIG. 3 and FIG. 3A are a circuit diagram of the transmitter equalizer of FIG. 2.

FIG. 3 shows a circuit diagram of an embodiment of the transmitter 10 of FIG. 2. The transmitter 10 in the embodiment shown in FIG. 3 is a differential signaling mode transmitter that receives input signal DATAIN and generates the equalized signal DATAOUT in the form of a differential output signal at a pair 21 of differential output terminals LINE+, LINE− for transmission over the channel 50, which in this case is a differential channel having at least two conductors 51 and 52. In this embodiment, the transmitter 10 is a current mode transmitter with the first driver 12 being a current mode driver having a substantially constant current source ISOURCE that causes signaling current to flow from power supply terminal Vdd to power supply terminal GROUND. In one embodiment, the first driver 12 is configured as a differential driver with a set of metal oxide semiconductor (MOS) transistors 32, 34 having their respective drain terminals coupled to the power supply terminal VDD through termination resistors 28, 30, respectively. The drain terminals of transistors 32, 34 are also connected to respective differential output terminals LINE+ and LINE−. The gate terminals of transistors 32 and 34 are driven by differential input data signals DATAIN+ and DATAIN−, respectively.

Figure 3A:
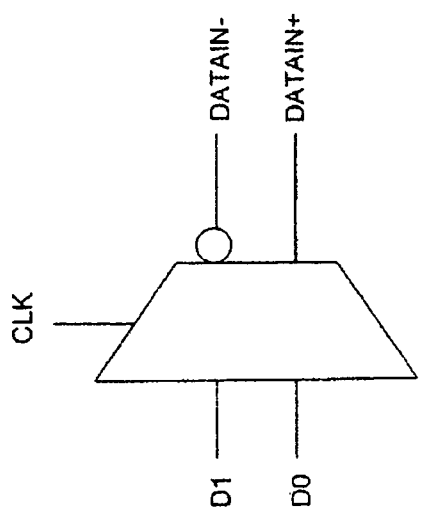

In one embodiment, as shown in FIG. 3A, DATAIN+ and DATAIN− are derived from two independent data streams D0 and D1 using, for example, a multiplexer 24, which clocks the bits in the data streams D0 and D1 onto DATAIN+ and DATAIN−. DATAIN+ may be the non-inverting output of the multiplexer 24 and DATAIN− may be the inverting output of the multiplexer, and vice versa. The multiplexer 24 may be a 2:1 multiplexer with two data inputs and a selector input coupled to a clock signal CLK to select between the two inputs. In one embodiment, the clock signal CLK is a periodic signal and the two independent sequences of digital bits D0, D1 are received at respectively ones of the two data inputs of the multiplexer 24 in parallel. When the clock signal CLK is at a high value, a digital bit D0 in a first one of the two sequences is selected and when the clock signal is a low value, a digital bit D1 in a second one of the two sequences is selected. Thus, the non-inverting output DATAIN+ supplies first the first bit, or digital value (0 or 1) of sequence D0, then the first bit of sequence D1, then the second bit of D0, then the second bit of D1, and so forth of input signal DATAIN in serial format. Simultaneously the inverting output DATAIN− supplies the complement of the bits, or digital values, supplied by DATAIN+.

In one embodiment, the second driver 14 is a pulse mode driver having a filter 16 that receives signals DATAIN− and DATAIN+ and generates a pair of outputs 15a and 15b having a rapid rise (or fall) followed by an exponential decay toward a zero signal level, herein referred to as a "spike", corresponding to each rising (or falling) edges of signals DATAIN− and DATAIN+, respectively. The filter 16 is shown to include a plurality of high-pass continuous-time passive filter networks 16a, 16b. The filter network 16a includes a series resistor-capacitor (RC) network comprising a filter resistor 20a and a filter capacitor 22a, and an inverter 18a. Likewise, the filter network 16b includes a series resistor-capacitor (RC) network comprising a filter resistor 20b and a filter capacitor 22b, and an inverter 18b. The values of the resistors and capacitors in the RC networks 16a and 16b can be selected to set a cutoff frequency and gain of the filter 16. The inputs of filters 16a, 16b are connected to the inverting and non-inverting outputs of the multiplexer 24, respectively, and the outputs 15a and 15b of the filters 16a and 16b, respectively, are connected to differential output terminals LINE+, LINE−, respectively. The outputs 15a and 15b of the filters 16a and 16b, along with the output of the transistors 32, 34, are combined at respective first and second nodes SUM1 and SUM2 to provide output signal DATAOUT over differential terminals LINE+, LINE−, respectively.

The filter 16 introduces a zero into the transfer function of the transmitter 10 because of the high pass filter characteristics of the filter. The zero of the filter 16 offsets the pole of the low pass filter characteristics of the attenuation of the signal channel 50. A combined transfer function H(Filter) of the filter 16 and transmitter 10 may be represented by:

$$H(\text{Filter}) = \frac{1}{(R + RO/4) \cdot C},$$

where R represents the filter resistance, C represents the filter capacitance and RO represents the differential impedance of the channel 50. In this embodiment, the filter resistance R is related to filter resistor 20a and/or 20b in addition to the output resistance of inverters 18a and/or 18b, the capacitance C is related to filter capacitor 22a and/or 22b and channel impedance RO is related to the impedance of the channel 50. For a system intended to send an output signal at a bit toggle frequency of about 5 GHz, a typical value for the filter resistor 20a is about 1000 ohms, the filter capacitor 22a is about 30 femtofarads, and the channel impedance may be about 100 ohms, which is about the same value as twice the resistance of the termination resistor 28 or 30. The impedance of the RC network of filter 16 is relatively high compared to the impedance of channel 50 so that the output termination impedance of transmitter 10 is determined mainly by resistors 28 and 30 and is therefore nearly resistive, providing a high-quality termination for channel 50.

Figure 4:
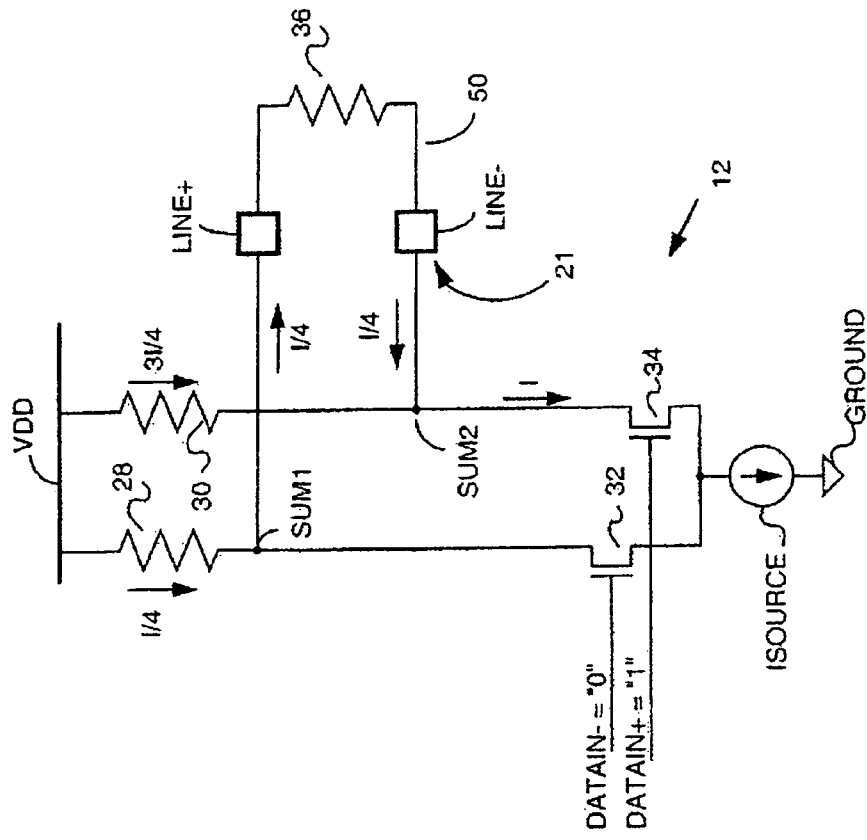
FIG. 4 is a diagram showing the operation of a component in the transmitter equalizer of FIGS. 2 and 3.
Figure 5:
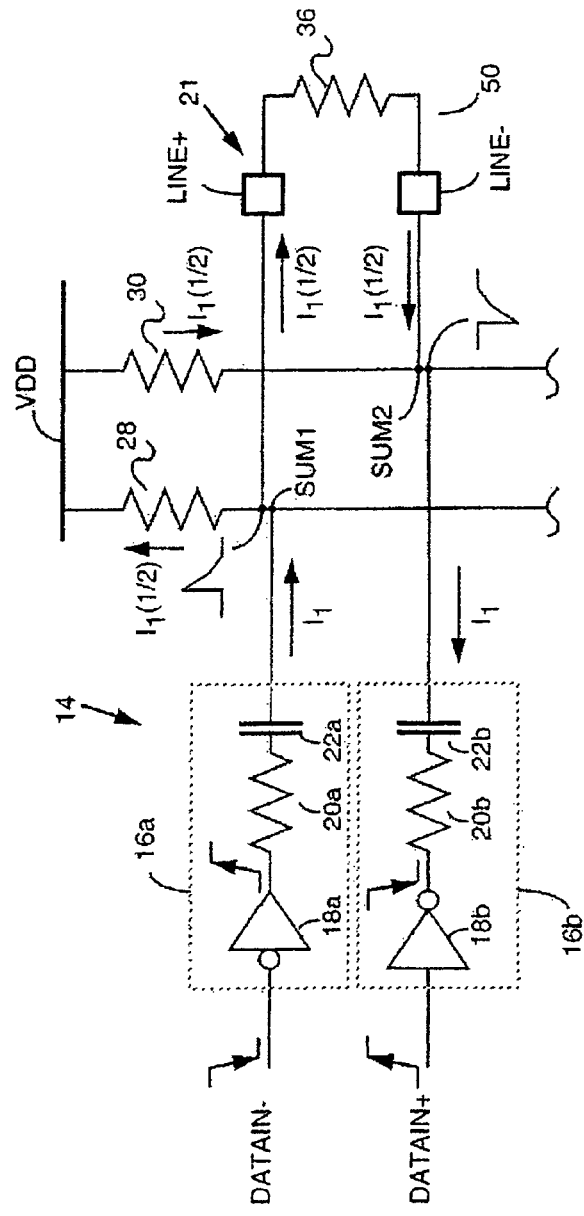
FIG. 5 is a diagram showing the operation of a component in the transmitter equalizer of FIGS. 2 and 3.

FIGS. 4 and 5 illustrate an operation of the transmitter 10 of FIGS. 2 and 3. FIG. 4 depicts current flow through the first driver 12 of the transmitter 10 assuming DATAIN+ is at a high value 1 and DATAIN− is at a low value 0, which is the complement of the high value 1. It is also assumed that the output of the transmitter 10 is connected to a channel 50 having an impedance represented by a resistor 36. For example, the channel impedance 36 may be about 100 ohms and the impedance of each of termination resistors 28, 30 may be about 50 ohms.

In the state depicted in FIG. 4, transistor 34 is ON (in a conductive state) in response to the high value of DATAIN+ and transistor 32 is OFF (in a non-conductive state) in response to the low value of DATAIN−. In this condition, a current I flows through the source and drain terminals of transistor 34 to the constant current source ISOURCE. Transistor 32, in its non-conductive state, prevents current flow through its source and drain terminals. In this condition, a current path from VDD to ISOURCE through resistor 30 has a total impedance substantially equal to the impedance of termination resistor 30, which, in one example, may be about 50 ohms. Another current path from VDD to ISOURCE has a total impedance equal to the sum of the impedance of termination resistor 28 and the channel impedance 36, which sum, in one example, is about 150 ohms. As a result, the current flowing through resistor 28 and channel impedance 36 is about I(¼) and the current flowing through resistor 30 is about I(¾). The current I(¼), along with the current I(¾), is summed at summing junction SUM2 to provide a total current of I which flows through transistor 34. Although not shown, the first driver 12 works in a complementary manner when the transistor 34 is driven by a low value and the transistor 32 is driven by a high value. That is, the transistor 34 turns OFF (non-conductive state) and the transistor 32 turns ON (conductive) which allows current I(¼) to flow through channel impedance 36 but in the opposite direction to that of the above example. The current I is shown to be a steady state signal.

FIG. 5 illustrates current flow through the second driver 14 of the transmitter 10 according to one embodiment of the present application. In one embodiment, the second driver 14 is a pulse mode driver that functions in response to transitions in the input signal DATAIN and not to a steady state high or low value of the input signal. In FIG. 5, it is assumed that the input DATAIN+ to inverter 18b is making a positive (from low to high) signal transition and the input DATAIN− to inverter 18a is making a negative (from high to low) signal transition.

The positive signal transition on the inverter 18b causes it to generate a negative voltage transition on its output. In a complementary manner, the negative signal transition on the input to the inverter 18a causes it to generate a positive signal voltage transition on its output. The positive voltage transition on the output of the inverter 18a causes a current $I_1$ to flow through the RC network of filter 16a such that a positive current spike signal is generated at the summing junction SUM1. The negative voltage transition on the output of the inverter 18b causes current $I_1$ to flow through the RC network of filter 16b such that a negative current spike is generated at the summing junction SUM2. The current signal $I_1$ at the summing junction SUM1 is distributed through two current paths: an amount of current $I_1(\frac{1}{2})$ flows through the channel 36 and an amount of current $I_1(\frac{1}{2})$ flows through termination resistor 28 to the power supply source VDD. The spike current signal $I_1$ at the summing junction SUM2 is the sum of current $I_1(\frac{1}{2})$ flowing through the channel 36 and current $I_1(\frac{1}{2})$ flowing through termination resistor 30 from the power supply source VDD. Thus, the voltage transitions on the output of the inverters 18a, 18b associated with the filters 16a, 16b cause currents to flow through each RC network of the filters and onto the channel 50. For an opposite transition in the digital signal DATAIN, filters 16a, 16b operate in a complementary way to provide an oppositely-directed current pulse or spike on the channel 50.

The second driver 14 works in combination with the first driver 12 to overdrive each signal transition by providing an additional boost to the signal provided by the first driver 12 at or immediately after each transition of the input signal DATAIN. The additional boost may be achieved by using the energy from the filter capacitors which function as charge pumps to drive additional current to the channel. Both the first driver 12 and the second driver 14 may be referenced to the same power supply voltage VDD so both output currents used to drive the channel are proportional to the supply voltage. The magnitude of the additional current provided by the second driver 14 may be represented by the following:

$$|I1| = \text{VDD}/(R + RO/4),$$

where VDD is the supply voltage, R represents the filter resistance and RO the channel impedance. In an embodiment, the magnitude of the additional current $I_1$ is about 1 mA based on a supply voltage VDD of about 1 V, the filter resistor R of about 1000 ohms and the channel impedance RO of about 100 ohms In addition, the second driver 14 consumes relatively little power because it operates only upon transitions in the input signal DATAIN, and consumes nearly zero power when the digital input signal DATAIN does not change value.

Figure 6:
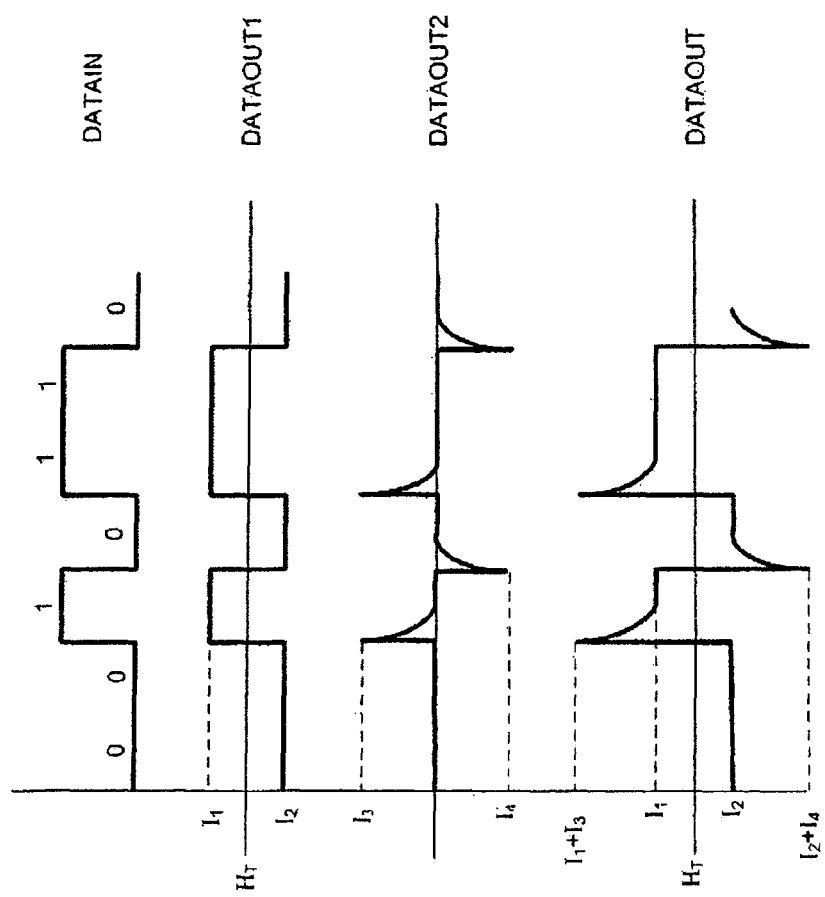
FIG. 6 shows graphs of certain signals in the operation of the transmitter of FIGS. 2 and 3.

FIG. 6 shows an operation of the transmitter 10 in response to an input signal DATAIN which in this example includes a series of bits having values 0010110 corresponding to a plurality of bit intervals $t_0$ through $t_6$. The signal DATAOUT1 is generated by the first driver 12, whereas the signal DATAOUT2 is generated by the second driver 14, and the output signal DATAOUT is the combination of signals DATAOUT1 and DATAOUT2. DATAOUT is applied to the signal path 50 as the output signal of the transmitter 10 in response to the input signal DATAIN. Signals DATAOUT1, DATAOUT2 and DATAOUT are depicted in FIG. 6 as currents in the signal path 50, with current in the direction from LINE+ to LINE− (FIG. 4) generating a positive voltage between LINE+ and LINE− and current in the direction from LINE− to LINE+(FIG. 4) generating a negative voltage. A transmitter threshold or central value $H_t$ is set at about zero signal level (e.g., no current flowing in the channel, and no voltage across pins LINE− and LINE+).

During the first two bit intervals $t_0$ and $t_1$, the digital value being transmitted is 0, and the signal parameter, i.e., the current, of signal DATAOUT1 remains at a constant, discrete value $I_2$ denoting the digital value 0. $I_2$, in this case, may be a negative current, about −1 mA, for example. During these bit intervals, there is no transition in digital values or the discrete values of the signal parameter, and the second driver 14 remains inactive, resulting in signal DATAOUT2 having a signal parameter or current of zero. Thus, the output signal DATAOUT has a constant current or signal parameter at the value $I_2$.

In the next bit interval $t_2$, the digital value 1 is supplied to drivers 12 and 14. The first driver 12 provides the signal DATAOUT1 with a signal parameter or current having a different discrete value $I_1$ denoting the digital value 1, which, in this case, is a positive current of about +1 mA, for example and remains constant during the bit interval. In response to the transition in the digital value between bit intervals $t_1$ and $t_2$, the second driver 14 generates signal DATAOUT2 as a current pulse or spike that rises rapidly to value I3, beginning at the commencement of the bit interval $t_2$, and decays toward a steady state value (e.g., zero magnitude) during that bit interval. The output signal DATAOUT during interval $t_2$ is the sum of the discrete value $I_1$ and the spike, so has a value $I_1+I_3$ at the beginning of the bit interval. The transition in this case is a positive transition or has a positive sense because it corresponds to a positive change in the digital value, from 0 in time interval $t_1$ to 1 in time interval $t_2$, or an increase in the signal parameter supplied by driver 12, from $I_1$ in time interval $t_1$ to $I_2$ in time interval $t_2$ succeeding the time interval $t_1$. As a result, the spike in the signal parameter or current supplied by driver 14 also has a positive value. Stated another way, the spike used during the post-transition interval $t_2$ has the same sense (positive) as the corresponding transition.

A negative transition occurs between time interval $t_2$ and time interval $t_3$, corresponding to a negative change in digital values (from 1 to 0). In the next bit interval $t_3$, a 0 digital value is supplied to the drivers. The first driver 12 generates DATAOUT1 with the negative current or discrete value $I_2$ denoting a 0 digital value, whereas the second driver 14 generates a negative pulse or spike in DATAOUT2 at the commencement of interval $t_3$, which drops rapidly after the transition between intervals $t_2$ and $t_3$ to a value of $I_4$ and decays gradually upward toward zero during the interval $t_3$. Again, spike or current pulse occurring during the post-transition interval has the same sense as the transition itself, so that the current driving into the channel is $I_2+I_4$ at the beginning of the bit interval.

In the next interval t4, a digital value of 1 is supplied to the drivers. As in interval $t_2$, driver 12 supplies signal DATAOUT1 with discrete value $I_1$ denoting digital value 1, and driver 14 supplies a positive current pulse or spike with initial amplitude $I_3$ in response to the transition between digital values. Here again, the pulse or spike has the same sense as the transition, and the initial amplitude at the beginning of the bit interval is $I_1+I_3$.

In the next interval $t_5$ of the same clock cycle, the digital value 1 is again supplied to the drivers. The output DATAOUT1 of the first driver 12 remains at discrete value $I_1$. Because there is no transition between two successive digital values in DATAIN, the second driver 14 does not generate a pulse or spike output.

At the commencement of the next interval $t_6$, the digital value DATAIN transitions from 1 to 0. During interval $t_6$, driver 12 supplies DATAOUT1 with the discrete value $I_2$ denoting zero, whereas driver 14 generates DATAOUT2 as a negative pulse or spike which decays gradually upward toward zero.

In summary, DATAOUT1 is mostly a replicate of the sequence of digital input values DATAIN, in that DATAOUT1 includes a series of discrete values (e.g., $I_1$ and $I_2$) of an output signal parameter (e.g., current) denoting the digital input values. DATAOUT2 includes spikes during post-transition data intervals, the spike during each post-transition data interval has the same sense as the transition between discrete values at the commencement of such data interval. As discussed above, the output signal DATAOUT supplied to the signal path is a combination (e.g., a sum or superposition) of DATAOUT1 and DATAOUT2.

Thus, the equalizing transmitter 10 is operative to output a signal DATAOUT that is a combination of two signal components, a first signal component DATAOUT1 having one of a plurality of discrete values for each one of a series of data intervals (e.g., $t_0$-$t_6$), and a second signal component DATAOUT2 that resembles a high-pass filtered version of the first signal component. In the first signal component, a plurality of discrete values represent respective ones of a series of digital values. In the second signal, a spike or pulse corresponds to each transition in the first signal component, which transition corresponds to a change from a first discrete value corresponding to a first data interval to a second, different discrete value corresponding to a second data interval succeeding the first data interval. The spike or pulse has a same sense as the transition and includes a sharp change from a steady state value of the second signal component followed by an exponential decay toward the steady state value.

The inclusion of the spikes or pulses materially boosts the high-frequency content of DATAOUT, at frequencies about the same or above the bit toggle frequency $½T_B$, as compared with DATAOUT1. There are two distinct parameters of filter 16 that can be adjusted independently to help cancel ISI in the communications channel. The first parameter is the "gain" G of the filter. Referring to FIG. 6, the filter gain $G=I_3/I_1=I_4/I_2$. The second parameter is the cutoff frequency of the filter, defined previously.

Referring to FIGS. 3, 4, and 5, the gain of the filter 16 can be adjusted by varying the relative currents produced in data transmitters 12 and 14. For example the inverters 18a and 18b may obtain their supply voltage from the same power supply terminals, VDD and GROUND, as transmitter 12. In this case, the amplitude of the output current from transmitter 14 is about equal to VDD/(R+R0/4), and the current delivered from transmitter 14 to the channel is $|I_3|=|I_4|=0.5*VDD/(R+R0/4)$. The current in the ISOURCE constant current source in transmitter 12 can be made proportional to VDD/R0, and the current delivered to the channel from transmitter 12 is therefore $|I_1|=|I_2|=K*VDD/(4*R0)$, where K is a proportionality constant established during the design process or during operation of transmitter 10. The filter gain is $G=|I_3|/|I_1|=2*R0/(K*(R+R0/4))$. Therefore the filter gain can be adjusted by changing the current in ISOURCE, by varying K, or by changing the value of resistor R. Alternatively, inverters 18a and 18b may be powered from a variable power supply other than VDD, and the filter gain may be changed by adjusting the voltage on this power supply. These alternatives are provided by way of example only, and any other means may be used to vary the filter gain that effectively changes the resistance or source voltage in filter 16.

The second filter parameter, the filter cutoff frequency, may likewise be varied over a range of values. The cutoff frequency may be varied from frequencies greater than the bit toggle frequency to frequencies below the bit toggle frequency. However, when the cutoff frequency of filter 16 is set below about half the bit toggle frequency, the method becomes less effective because the signal from transmitter 14 does not return substantially to zero during a single bit interval. The filter frequency may be varied by changing the value of the capacitors 22a and 22b, leaving the values of resistors 20a and 20b fixed, or it may be varied by leaving the capacitors fixed and varying the resistance of the resistors. The latter method also changes the gain of the filter, so is generally less desirable.

Figure 7A:
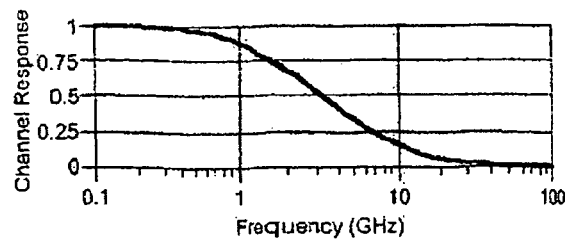
FIG. 7A is a graph of the frequency response illustrating a channel attenuation.
Figure 7B:
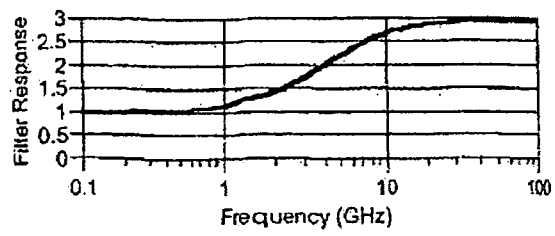
FIG. 7B is a graph showing the frequency response of the transmitter equalizer shown in FIGS. 2 and 3.
Figure 7C:
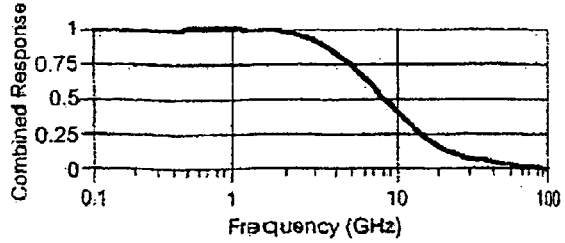
FIG. 7C is a graph showing the combination of equalization and channel attenuation.
Figure 7D:
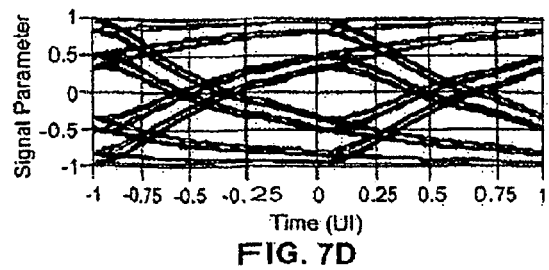
FIG. 7D is a graph showing an eye diagram for a pseudo-random bit sequence transmitted without equalization.

FIG. 7A shows the frequency response H(Channel) of an example channel having two poles at the bit toggle frequency of 5 GHz. FIG. 7B shows the frequency response H(Filter) of the transmitter equalizer, the combination of transmitters 12 and 14. H(Filter) in this example has a high-pass cutoff, or zero, frequency equal to the bit toggle frequency, and the gain of the filter is set to G=2.0. FIG. 7C shows the combination response H(Filter)*H(Channel) of filter equalization H(Filter) of FIG. 7B and channel attenuation H(Channel) of FIG. 7A. As seen in FIG. 7C, the high pass filter function H(Filter) substantially cancels the low pass (high-frequency attenuation) of the channel H(Channel) providing a fairly flat response over the frequency band of interest from near DC to about half the bit toggle frequency, and modest (3 dB) attenuation at the bit toggle frequency. As explained above, the cutoff frequency of the filter can be adjusted by varying the value of the RC network of the filter 16. In this example, the cutoff frequency of the high-pass filter 16 is set at the bit toggle frequency of the input signal, assumed to be 5 GHz FIG. 7D shows a data eye diagram for a pseudo-random bit sequence transmitted through the channel, whose frequency response is shown in FIG. 7A, but without equalization. A data eye diagram is a graph in which a series of 2-unit-interval-long time sequences of the data stream measured at the end of the channel are overlapped and superimposed along the time axis. The time axis is expressed in terms of bit intervals or unit intervals, with 0 UI at the nominal center of the eye. FIG. 7D shows that the eye is "closed", that is the height or amplitude of the signal has been reduced by about 0.3 due to inter-symbol interference in the channel. Further, the horizontal extent of the eye along the time axis has also been reduced by about 0.5 due to inter-symbol interference in the channel.

Figure 7E:
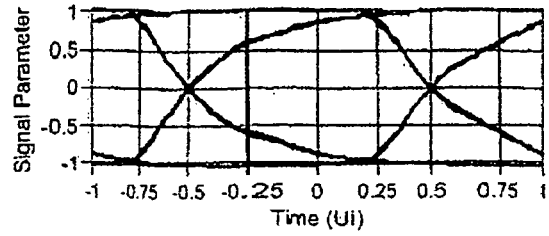
FIG. 7E is a graph showing an eye diagram for the same pseudo-random bit sequence shown in FIG. 7D, but transmitted using the equalizer of FIGS. 2 and 3.

FIG. 7E shows a data eye diagram for the same pseudo-random bit sequence as shown in FIG. 7D, but using the transmitter equalizer, whose frequency response is shown in FIG. 7B, to drive the channel. The equalization filter has opened the eye to about 0.9 in its vertical extent and to nearly 1.0 in the horizontal extent.

Figure 8A:
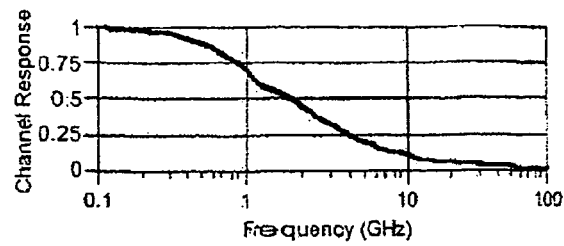
FIGS. 8A through 8E show the frequency response of a channel, filter, and equalized channel, and eye diagrams with and without equalization, but for a different channel response and different equalization adjustment than shown in FIGS. 7A through 7D.
Figure 8B:
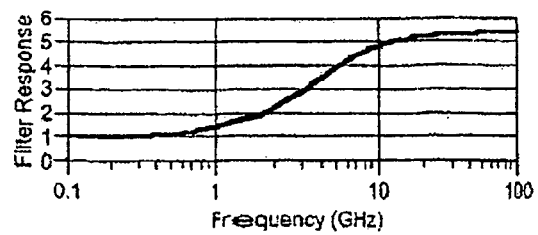
Figure 8C:
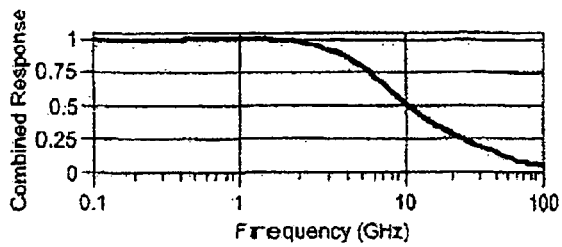

FIG. 8A shows another example of a channel response H(Channel), this example having a single pole at 1 GHz, or one-fifth of the bit toggle frequency. Attenuation at the bit toggle frequency for this channel is about 0.2. FIG. 8B shows the filter frequency response H(Filter), where the filter cutoff frequency or pole frequency is still set at the bit toggle frequency, and the filter gain is set at G=4.2. FIG. 8C shows the combined response H(Filter)*H(Channel) for the transmitter-equalized channel. As in the example of FIGS. 7A through 7C, the combined response is essentially flat to about half of the bit toggle frequency and shows modest (3 dB) attenuation at the bit toggle frequency.

Figure 8D:
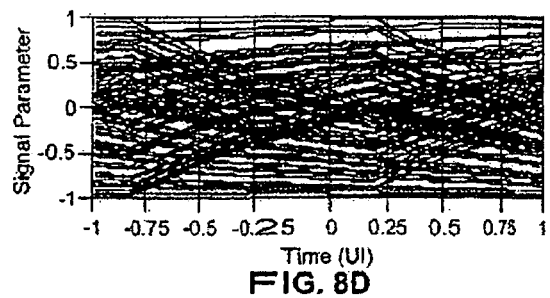
Figure 8E:
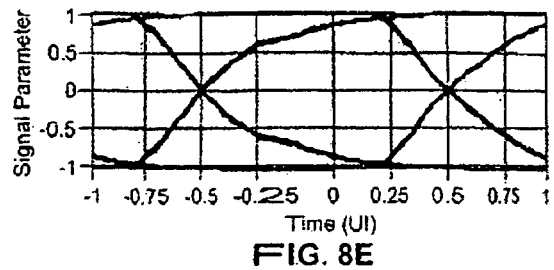

FIG. 8D shows a data eye diagram for a pseudo-random bit sequence transmitted through the channel with frequency attenuation shown in FIG. 8A. This eye is completely closed, and it would be impossible to recover the transmitted data passing through this example channel. FIG. 8E shows a data eye diagram for the equalized channel, whose frequency response is shown in FIG. 8C. This eye is again opened to 0.9 in vertical extent and 1.0 in horizontal extent by the transmitter equalizer.

Figure 9A:
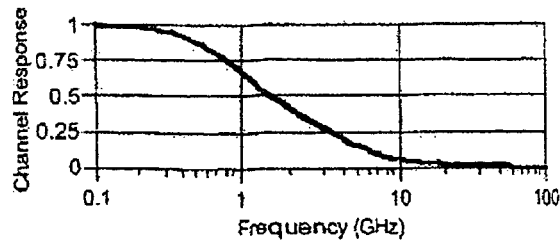
FIGS. 9A through 9E show the frequency response of a channel, filter, and equalized channel, and eye diagrams with and without equalization for yet another channel response and different equalization adjustment.
Figure 9B:
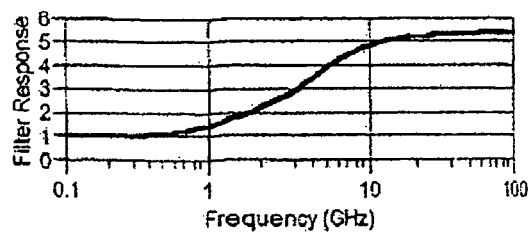
Figure 9C:
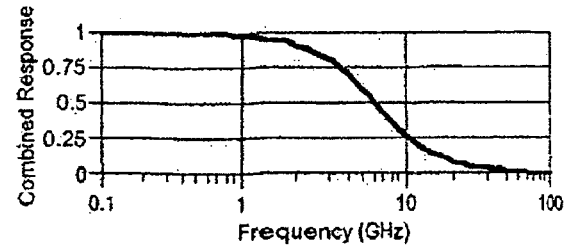

FIG. 9A shows yet another example channel response H(Channel), this one comprising two poles located at 2.5 GHz, half the bit toggle frequency. Attenuation at the bit toggle frequency is about 0.15. FIG. 9B shows the frequency response of the transmitter equalizer H(Filter) with cutoff frequency again set at the bit toggle frequency, and gain set at G=4.5. FIG. 9C shows the combined frequency response of channel and filter H(Filter)*H(Channel). The equalized response is flat to about ⅓ of the bit toggle frequency, and attenuation at the bit toggle frequency is about 0.6.

Figure 9D:
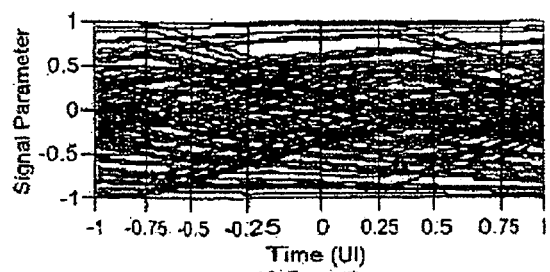
Figure 9E:
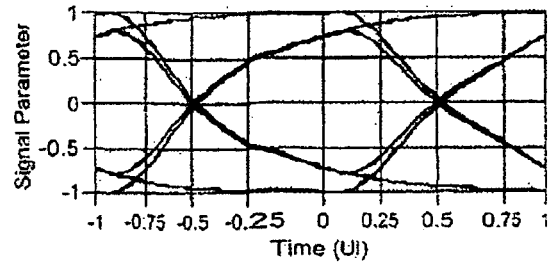

FIG. 9D shows a data eye diagram for a pseudo-random bit sequence transmitted through the channel with frequency attenuation shown in FIG. 9A. This eye is completely closed. FIG. 9E shows a data eye diagram for the equalized channel, whose frequency response is shown in FIG. 9C. This data eye, while not fully open in the vertical extent, is opened to about 0.7 of the signal parameter and would be easily detected by a receiver at the end of the channel. The horizontal extent of this eye is opened to essentially 1.0.

Considered qualitatively, the presence of the spikes associated with data transitions increases the amplitude of the signal after a transition between different discrete values of the signal parameter. As discussed above with reference to FIGS. 1A-1E, and as shown in FIGS. 7A, 8A, and 9A, the signal path tends to attenuate high-frequency components to a greater degree than low frequency components, and thus tends to convert a sudden transition into a more gradual transition. The presence of the spikes compensates for this characteristic of the signal path. After attenuation in the signal path, the waveform of DATAOUT may approximate the waveform of DATAOUT1, with approximately square transitions between different values of the signal parameter. As explained above in connection with FIG. 1C, such a waveform provides a good data "eye" for operation of the receiver.

Again, the spikes or current pulses are provided during post-transition data intervals, following transitions between digital values. The pulse-mode circuits used in the second driver 14 draw essentially no power between transitions. This is in marked contrast to a differential current-steering driver using a current source such as the first driver 12. A differential current-steering driver continues to draw current through the current source even when it is producing a zero differential signal; in that condition, equal current flows pass through both transistors. The pulse-mode circuits do not suffer from this drawback. Additionally, the data transmitter 14 need only provide sufficient amplitude to overcome DC losses in the channel, and fixed sources of noise, such as thermal noise and input offset in the receiver. For all of these reasons, the equalizer 10 uses power efficiently, in that the power incorporated in the spikes or pulses can be relatively small, and the power in the no-equalizing transmitter 12 can be reduced to the minimum required by the channel and receiver. Stated another way, for a given power consumption, the signal-tonoise ratio of the signal can be higher than would be in the case with a less efficient equalizer, such as a conventional transmitter equalizer.

Figure 10:
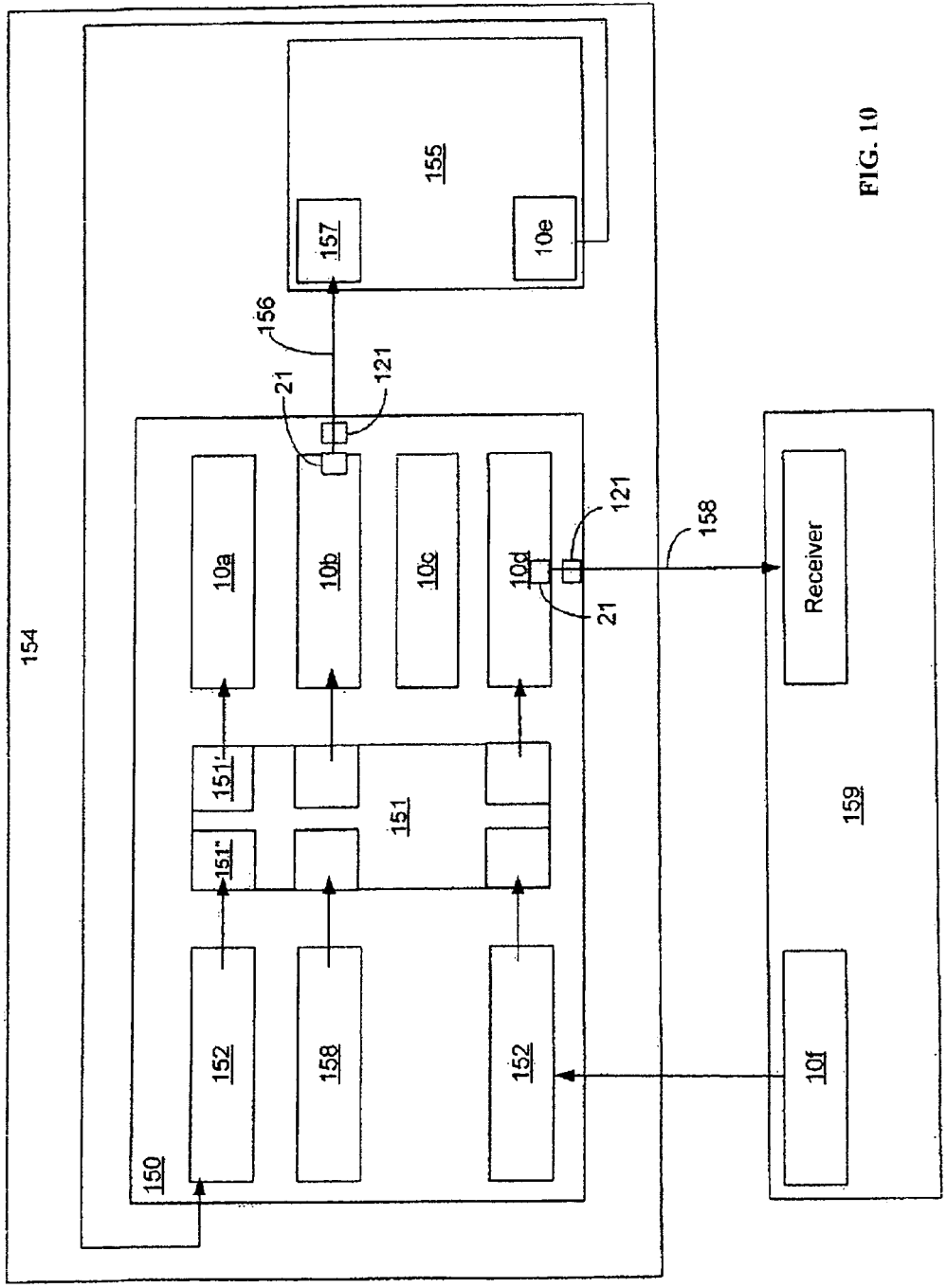
FIG. 10 is a block diagram of a system incorporating the transmitter of FIG. 2 in accordance with an embodiment of the present application.

The equalization arrangement discussed herein can be incorporated readily in monolithic integrated circuits. For example, as depicted in FIG. 10, a semiconductor chip 150 has several equalizing transmitters 10a-10d formed within the chip, each equalizing transmitter 10a-10d including an equalizer 10 as discussed herein. The data input of each transmitter 10a-10d is connected to an operative circuit 151 within the chip 150. The operative circuit 151 may include one or more central processing units, memory circuits, bridge circuits, or the like. The operative circuit may be a circuit which requires relatively high-speed data communication as, for example, at data rates at or above 300 Mbits/sec, or at or above about 1 Gbit/sec as, for example, at about 10 GBit/sec. Equalizing transmitters 10b, 10c and 10d have their output connections 21 coupled to contacts 121 of the chip so that the output connections can be electrically connected to a signal path external to the chip. For ease of illustration, only one contact 121 is depicted in FIG. 10 associated with each of these transmitters. However, where the output connection includes a pair of connections as discussed above, a pair of external contacts is provided for each transmitter. Transmitter 10a has its input connection coupled to a part 151' of the operative circuit in the chip, and has its output connections 21 coupled to a signal path 50a extending within the chip to a receiver 152 also formed within chip 150. The output of the receiver is coupled to another part 151" of the operative circuit. Thus, transmitter 10a is used for communication within the chip. This arrangement can be used, for example, for communication between widely-separated regions of the chip. Any number of transmitters 10 can be formed within the chip, and can be configured for intra-chip or off-chip communication as desired.

Chip 151 can be used as an element of a larger system 153. The system may include a housing 154, one or more additional electronic components 155 such as additional semiconductor chips or modules, disposed within the housing, and one or more internal signal paths 156 extending within the housing. For example, the off-chip connections 121 of transmitters 10b and 10c on chip 151 are connected by the internal signal paths 156 to receivers 157 incorporated in additional component 155. To provide bidirectional communication, the additional component 155 may have one or more transmitters, such as transmitter 10e connected by other internal signal paths to a receiver 158 incorporated within the chip, such receiver being connected to the operative circuit 151 of the chip. Transmitter 10e may be a transmitter as discussed herein. Plural transmitters, such as transmitters 10b and 10c, can be used to send multiple data streams in parallel. Chip 151 and additional component 155 may be part of a system which uses digital information. Merely by way of example, the operative circuit of chip 151 may include a central processing unit or CPU as commonly employed in a digital computer, whereas the additional component 155 may be a bridge chip commonly employed as an intermediary between the CPU and other chips. Also, chip 151 may be a memory chip and the additional component may be a processing unit such as a CPU or another chip which serves to connect the memory with the CPU for interchange of information between the memory and the CPU. For example, transmitters as discussed herein can be incorporated in the communication path between a processor such as a CPU and a cache memory. In other embodiments, chip 151 or additional component 155 may be an element of a peripheral device such as a data input or output device controller or the like.

Transmitter 10e on chip 151 is connected through its off-chip connection 121 to an external signal path 158 which extends outside of the device housing 154 and which is connected to a receiver in an external element. External element 159 optionally may have one or more further transmitters 10f connected to chip 151 to provide bidirectional communication.

Of course, although only a few internal and external signal paths are shown, any number of such paths can be used. The internal signal paths 156 and external signal path 158 may be baseband signal paths, i.e., signal paths without modulation or demodulation. Most commonly, the signal paths may include conductors or pairs of conductors as, for example, conductors in printed circuit boards, cables or the like. Such baseband conductors are often used for signal transmission over relatively short distances as, for example, about 10 meters or less. Merely by way of example, transmitters as discussed herein may be used as elements of point-to-point connections according to protocols such as PCI Express, Serial ATA and other protocols. Also, the transmitters as discussed herein can be used with bus connections, i.e., arrangements in which the same signal is sent to plural devices connected to the same conductors.

Figure 11:
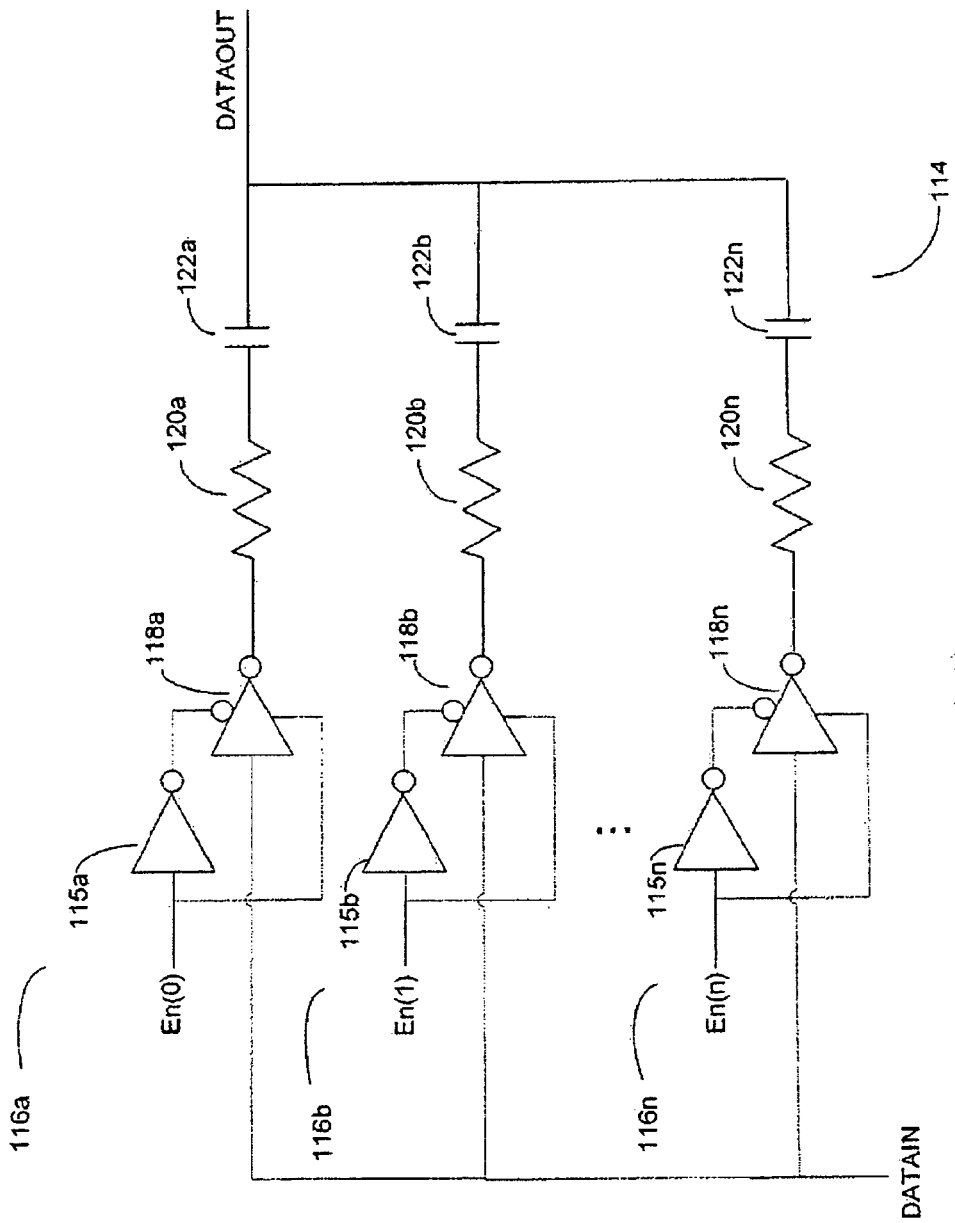
FIG. 11 is a block diagram of an adjustable transmitter in accordance with another embodiment of the present application.

In one embodiment, as shown in FIG. 11, each of filters or filter networks 16, 16a, and 16b may include a set of filters 116a, 116b, . . . , 116n configurable to provide a filter transfer function H(Filter) having an adjustable gain and/or cutoff frequency. The filters 116a-116n include RC networks comprising filter resistors 120a-120n and filter capacitors 122a-122n, respectively, similar to the resistor-capacitor network of filter 16a discussed above with reference to FIG. 3. The filters 116a-116n are coupled to each other in parallel but are enabled based on the state of enable signals En[0]-En[n], respectively. The filters 116a-116n include tristate inverters 118a-118n controlled by buffers 115a-115n via enable signals En[0]-En[n], respectively. For example, in filter 116a, when the signal En[0] is set to a high value, the buffer 115a enables the tristate inverter 118a which connects the filter 116a to other enabled filters. In contrast, when the enable signal En[0] is set to a low value, the buffer 115a disables the tristate inverter 118a which disconnects the filter 116a from other filters.

The characteristics of the filters 116a-116n can be selected to provide a filter transfer function H(Filter) with a particular gain and frequency cutoff. For example, the value of the resistors 120a-120n and capacitors 122a-122n can be set to the same value. In this case, the gain G of the transfer function of the filter H(Filter) increases as the number of filters is enabled. In another example, the value of the resistors 120a-120n and capacitors 122a-122n can be set to different values set to provide zeros at different cutoff frequencies. In this case, the order of the transfer function of the filter H(filter) increases as the number of filters is enabled. Alternatively, a combination of the above approaches can be employed to provide a filter with increased amplitude and different cutoff frequencies.

The enable signals En[0]-En[n] can be programmed to selectively enable the filters 116a-116n in accordance with various algorithms or techniques to provide a filter transfer function H(Filter) with a particular gain and frequency characteristic. For example, during design of a system which incorporates a chip having a transmitter equalizer, the transfer function of the filter H(Filter) can be calculated to offset the frequency attenuation of a channel H(Channel) which is to be coupled to the output of the transmitter. Based on this information, the combination of high and low enable signals En[0]-En[n] can be determined to provide a particular transfer function H (Filter). An internal circuit within the chip (not shown) or an external circuit can be programmed to supply the selected combination of enable signals. In a further embodiment, a receiver connected to a transmitter can evaluate channel conditions at its end and determine coefficients representing such conditions. The receiver can send the coefficients to the transmitter via a separate channel (back channel) which can be used by the transmitter to program the enable signals. This technique allows the transmitter to adjust channel equalization dynamically based on changing channel conditions. Suitable algorithms for determining the equalization coefficients include both edge-based algorithms and amplitude-based algorithms.

To implement an amplitude-based algorithm, for example, the receiver can be configured during a startup sequence to measure the voltage amplitude of the eye at the center (maximum amplitude point) of the eye, and acquire the amplitude averaged over a large number of data bits in a series of random or pseudo-random bits transmitted from transmitter to receiver. If this average eye height or amplitude is acquired for each of a number of settings of the transmitter equalizer, an optimum setting can readily be determined by taking the setting that yields the highest average amplitude. Alternatively, the receiver can be equipped with an extra sampler, not used for receiving data from the transmitter, that can sample the amplitude of the data eye continuously during normal data transmissions. This 'extra' data sampler's measurement of average amplitude over many bits can be used to drive the equalization value toward an optimum value without the need to interrupt normal data transmission. This type of equalization adjustment can accommodate changes in H(channel) that may result from, for example, temperature changes to the system that embeds the channel.

To implement an edge-based algorithm for adjusting the equalization setting in the transmitter, the receiver may be equipped with an "Alexander" style phase detector, in which samplers are provided to sample the data stream in the center of each data eye (data samplers) and other samplers are provided to sample the data stream at the "edges" or data transitions between successive data bits (edge samplers). A series of edge and data samples is taken, such that each successive edge and data sample represents the digital value of the received signal every half bit interval, denoted E(0), D(0), E(1), D(1), E(2), . . . where D(1) is the data sample taken one bit interval after D(0), E(1) is the edge sample taken one bit interval after E(0), and so forth. If D(1) differs from D(0) it can be inferred that there is a data transition between these two data samples. If D(1) does not equal D(0) and E(1)=D(1), it can be inferred that the samples were taken "late" and that the sampling clock within the receiver should be retarded in time to sample the data bits at the optimum point (highest amplitude) at the center of the data eye. If however D(1) does not equal D(0) and E(1)=D(0), it can be inferred that the samples were taken "early" and that the sampling clock should be advanced in time. These "early" and "late" indications can be further used to determine if the equalization setting in the transmitter is adjusted optimally. For example, assume that the number of "early" and "late" indications averaged over a large number of random data bits is the same, indicating that the sampling clocks in the receiver are optimally placed. If the received data is now searched for a pattern having a large number of 0's followed by a single 1 followed by at least one 0 and the early/late indication is examined for the transition from 0 to 1 before and the early/late indication for the transition from 1 back to 0, then if the early/late indication for the 0 to 1 transition is consistently "early" while the indication for the 1 to 0 transition is consistently "late", it can be inferred that the channel is under-equalized and that the gain G of the equalization filter in the transmitter needs to be increased. Similarly if the early/late indication for the 0 to 1 transition is consistently "late" while the indication for the 1 to 0 transition is consistently "early", it can be inferred that the channel is over-equalized and that the gain G of the equalization filter in the transmitter should be reduced. In either case, this information can be sent back to the transmitter over a back channel so that the equalizer can be adjusted appropriately. Note further that a data pattern having a large number of 1's followed by a single 0 followed by at least a single 1 is equivalent, and its early/late indications may be analyzed in exactly the same way. Further, the correlation of early/late indications with other patterns may be used to drive toward the correct equalization setting.

Further, these previously described examples of an amplitude-based and an edge-based equalization adaptation algorithm are merely illustrative examples.

The second driver 14 discussed above with reference to FIG. 3 uses a pair of filters 16a and 16b to provide differential-mode operation. To provide similar differential-mode operation, the second driver may include two sets of filters as shown in FIG. 3. The two sets of filters may be set to have the same transfer function.

Still other embodiments are contemplated. For example, the transmitter has been described in the context of a current mode transmitter, but other modes are contemplated such as a voltage mode transmitter having a constant voltage source. The transmitter has been explained in the context of a differential mode of operation but other modes are contemplated such as a single-ended mode. Also, in the current-mode examples discussed above, the transmitter threshold $H_T$ is at zero current. In other systems, the transmitter threshold may be at a non-zero value of the signal parameter such as current or voltage. For example, in a current-mode system, a current in one direction having a value less than a threshold value may denote the digital value 0, whereas a current in the same direction having a value greater than the threshold may denote the digital value 1. Likewise, in a voltage mode system, a positive voltage less than the threshold voltage may denote digital value 0 whereas a positive voltage greater than the threshold voltage may denote digital value 1.

Figure 12:
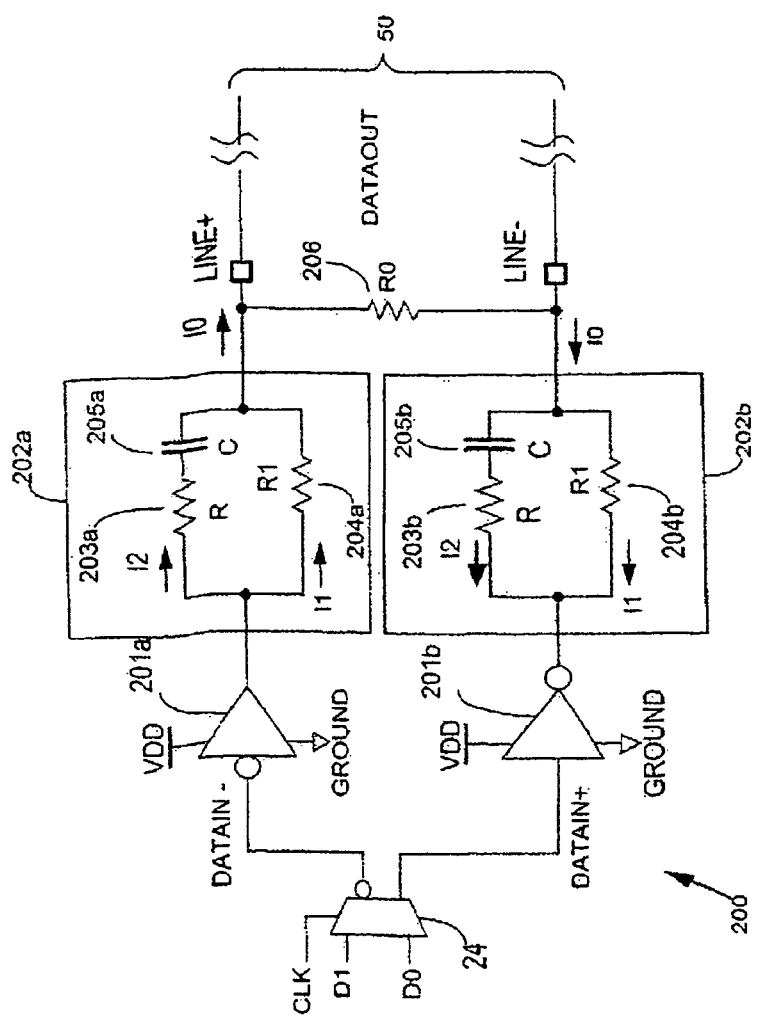
FIG. 12 is a block diagram of a transmitter in accordance with yet another embodiment of the present application.

In yet another embodiment the two transmitters of FIGS. 2-5 can be replaced with a single transmitter as shown in FIG. 12. As in FIG. 2, a multiplexer 24 generates true and complement versions of a data signal to be transmitted on DATAIN+ and DATAIN−. DATAIN+ and DATAIN− drive inverters 201a and 201b respectively, which form the drivers for this transmitter. The inverters 201a and 201b operate between power supply terminals VDD and GROUND and produce inverted versions of their input signals on their outputs, the signals toggling between voltages of about VDD for logic "1" and GROUND for logic "0". The outputs of inverters 201a and 201b drive two networks 202a and 202b respectively, containing resistors 203a, 203b, 204a, 204b, and capacitors 205a and 205b. The upper half of these networks, in which resistor 202a is coupled in series with capacitor 205a and resistor 202b is coupled in series with capacitor 205b, are analogous to the high-pass filters in transmitter 14 in FIGS. 2 and 3. The lower halves of the two networks, comprising resistors 204a and 204b, are analogous to transmitter 12 in FIGS. 2 and 3. These networks are high-pass filters whose H(Filter) at DC is >0. The outputs of the two networks drive the transmitter outputs LINE+ and LINE−, which drive channel 50 to a receiver (or receivers). A terminator resistor 206 is coupled between the two outputs LINE+ and LINE−.

When DATAIN+="1" and DATAIN−="0", then in the steady state (no transitions on the DATAIN signals) inverter 201a drives current I1 through resistor 204a, terminator 205, and then through resistor 204b and into inverter 201b. Currents I2 in the upper half of each of networks 202a and 202b are zero in the steady state, and current I0=I1. If inverters 201a and 201b are assumed to have internal resistance Ri, the voltage developed between LINE+ and LINE− is $$Vn = Vdd*R0/2*1/(R0/2+2*(R1+Ri))$$

When DATAIN+="0" and DATAIN−="1", then in the steady state (no transitions), then the voltage between LINE+ and LINE− is −Vn.

Immediately following a positive data transition, current I2 is no longer 0, since current flows in the upper halves of networks 202a and 202b. During the initial rapid rise of the "spike", the voltage developed between LINE+ and LINE− is $$Ve = Vdd*R0/2*1/(R0/2+2Ri+2(R*R1/(R+R1)))$$

The "gain" of this equalizing filter is $$G = (Ve-Vn)/Vn \text{ or}$$

$$G = 2*R1^2/((R0/2+2*Ri)*(R+R1)+2*R*R1)$$

And the gain may be adjusted by changing the ratio of resistances R1/R. For a given desired gain, for example, R can be found from $$R = (2*R1^2 - R1*G*(R0/2+2Ri))/(R0/2+2(Ri+R1))$$

In all other respects, transmitter 200 operates essentially the same as transmitter 10. The characteristics of the transmitter, such as the gain and frequency response of the filter, can be easily modified or adjusted using digital techniques. For example, the networks 202a, 202b can be configured to be adjustable in a manner similar to the techniques employed in filters 116a-116n shown in FIG. 11 and described above. The embodiment described in FIG. 12 is merely one example of many ways to implement a transmitter with a single driver and a high-pass network with adjustable ratio of high-frequency gain to DC gain. Other embodiments may employ current-mode or voltage-mode drivers and differential or single-ended signaling. In one embodiment, one or more of the transmitters 200 can be incorporated in a monolithic semiconductor chip.

The transistors of the transmitter are shown and described as MOS transistors but may alternatively be implemented using bipolar technology or any other technology in which a signal-controlled current flow may be achieved. The transmitter has been described in the context of a binary signaling system but other signaling modes are contemplated such as multi-level signaling. In multi-level signaling, the discrete value of the signal parameter applied during each data interval is selected from N discrete values, where N is greater than 2. Thus, the discrete value of the signal parameter may denote the combined values of two or more bits in a binary digital input signal or may denote a single multilevel digital value in a multilevel digital input signal. The format of the digital input signal has been described with reference to FIG. 3 and FIG. 12 in the context of a digital signal comprising two streams of digital bits in parallel, but in practice the digital input signal may be supplied in serial form or as any number of bits in parallel. Also, the digital input signal may itself be pre-processed or encoded before it is supplied to the transmitter. For example, an information-bearing signal may be encoded into a further digital signal incorporating a greater number of bits or multilevel digital values to provide a pre-processed signal, and that pre-processed signal may be supplied as the digital input signal to the transmitting equalizer as discussed herein.

Although the application herein has been described with reference to particular embodiments, it is to be understood that these embodiments are merely illustrative of the principles and applications of the present application. It is therefore to be understood that numerous modifications may be made to the illustrative embodiments and that other arrangements may be devised without departing from the spirit and scope of the present invention as defined by the appended claims.

The invention claimed is:

1. A transmitter comprising:
a first driver to generate a first signal representing a digital input signal; and
a second driver having at least one high pass filter to generate a second signal representing a high pass filtered version of the digital input signal, the high-pass filter generating spikes in the second signal corresponding to each transition of the digital input signal, each spike in the second signal having one of 1) a rapid rise from a zero signal level corresponding to a rising transition, and 2) a rapid fall from a zero signal level corresponding to a falling transition, followed by a gradual decay to the zero signal level, the first and second signals being combined to produce an output signal;
wherein the high-pass filter is configurable via a set of digital inputs to provide a filter transfer function.

2. The transmitter as claimed in claim 1 wherein the first driver and the second driver are referenced to a same power supply voltage.

3. The transmitter as claimed in claim 2 wherein ratio of an amplitude of the output signal to an amplitude of the first signal is independent of the power supply voltage.

4. The transmitter as claimed in claim 1 wherein the second signal includes a spike corresponding to a respective transition of the digital input signal.

5. The transmitter as claimed in claim 1 wherein each spike in the second signal has a same sense as the respective transition.

6. The transmitter as claimed in claim 5 wherein the gradual decay follows at least approximately an exponential decay pattern.

7. The transmitter as claimed in claim 1 wherein the second driver is a pulse-mode driver.

8. The transmitter as claimed in claim 1 wherein the at least one high pass filter has at least one of an adjustable frequency cutoff and an adjustable gain.

9. The transmitter as claimed in claim 1 wherein the at least one high pass filter has a frequency cutoff set to be about equal to a bit toggle frequency of the input signal.

10. The transmitter as claimed in claim 1 wherein the at least one high pass filter includes a continuous-time high pass filter comprising a resistor-capacitor network.

11. A monolithic semiconductor chip including one or more transmitters as claimed in claim 1.

12. The transmitter as claimed in claim 1 wherein the transmitter is to be coupled to a channel having a frequency attenuation, and wherein the second driver includes a set of high-pass filters including the high-pass filter, the set of high-pass filters providing the filter transfer function to offset the frequency attenuation.

13. A system including the transmitter as claimed in claim 12 and a receiver coupled to the transmitter through the channel, the receiver being configured to send a set of coefficients to the transmitter, the coefficient being used by the transmitter to configure the set of high-pass filters.

14. A transmitter comprising:
- a driver to generate a first signal representing a digital input signal; and
- a passive high-pass network having a high-frequency gain and a DC gain, wherein the passive high-pass network is adapted to receive the digital input signal and to generate a second signal having spikes corresponding to each transition in the digital input signal, each spike in the second signal having one of 1) a rapid rise from a zero signal level corresponding to a rising transition, and 2) a rapid fall from a zero signal level corresponding to a falling transition, followed by a gradual decay to the zero signal level, the transmitter being configured to combine the first and the second signals to form an output signal;
- wherein the passive high-pass network is configurable via a set of digital inputs to provide a filter transfer function.

15. The transmitter as claimed in claim 14 wherein the passive high-pass network has at least one of an adjustable cutoff frequency and an adjustable ratio of the high-frequency gain to the DC gain.

16. The transmitter as claimed in claim 14 wherein a frequency cutoff of the passive high-pass network is set to be about equal to a bit toggle frequency of the input signal.

17. The transmitter as claimed in claim 14 wherein the passive high-pass network is a continuous-time high pass filter comprising a resistor-capacitor network.

18. The transmitter as claimed in claim 14 wherein the transmitter is to be coupled to a channel having a frequency attenuation, and wherein the passive high-pass network provides the filter transfer function to offset the frequency attenuation.

19. A monolithic semiconductor chip including one or more transmitters as claimed in claim 14.

20. A method comprising:
- generating a first signal representing a digital input signal;
- generating a second signal, by at least one high-pass filter, representing a high pass filtered version of the digital input signal, the second signal including spikes corresponding to each transition of the digital input signal, each spike in the second signal having one of 1) a rapid rise from a zero signal level corresponding to a rising transition, and 2) a rapid fall from a zero signal level corresponding to a falling transition, followed by a gradual decay to the zero signal level;
- combining the first and second signals to produce an output signal;
- configuring the at least one high-pass filter via a set of digital inputs to provide a filter transfer function;
- sending the output signal along a signal path to a receiver.

21. The method as claimed in claim 20 wherein the gradual decay follows at least approximately an exponential decay pattern.

22. The method as claimed in claim 20 wherein the signal path has a frequency attenuation, and wherein configuring a set of the high-pass filter provides the filter transfer function to offset the frequency attenuation.

23. A method of data transmission comprising the steps of accepting a digital input signal having a plurality of discrete values corresponding to respective ones of a plurality of successive time intervals, and transmitting an output signal having a signal parameter which varies substantially as a combination of:
- a first function having one of a plurality of discrete values for each one of a series of data intervals, respective ones of the plurality of discrete values representing respective ones of the plurality of digital values; and
- a second function having at least one high pass filter corresponding to a high-pass filtered version of the first function, the second function including a pulse corresponding to each transition in the first function, each pulse including one of 1) a sharp rise from a steady state value of the second function corresponding to a rising transition, and 2) a sharp fall from a steady state value of the second function corresponding to a falling transition, followed by a gradual decay toward the steady state value that follows an exponential decay pattern;
- wherein the high-pass filter is configurable via a set of digital inputs to provide a filter transfer function.

24. A transmitter comprising:
- first driver means for generating a first signal representing a digital input signal;
- second driver means for generating a second signal substantially corresponding to a high pass filtered version of the digital input signal, the second driver means generating spikes corresponding to each transition of the digital input signal, each spike in the second signal having one of 1) a rapid rise from a zero signal level corresponding to a rising transition, and 2) a rapid fall from a zero signal level corresponding to a falling transition, followed by a gradual decay to the zero signal level;
- means for combining the first and second signals to produce an output signal; and
- means for configuring the second driver means via a set of digital inputs to provide a filter transfer function.

\* \* \* \* \*